C. E. DATH.
HAND BRAKE.
APPLICATION FILED JAN. 8, 1918.
1,300,351. Patented Apr. 15, 1919.
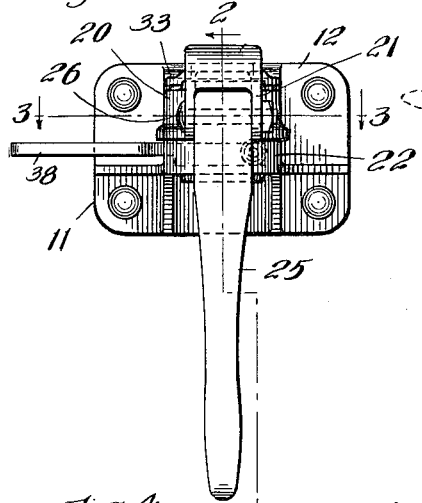
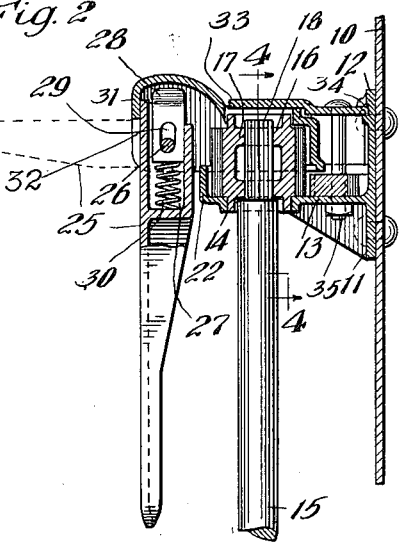
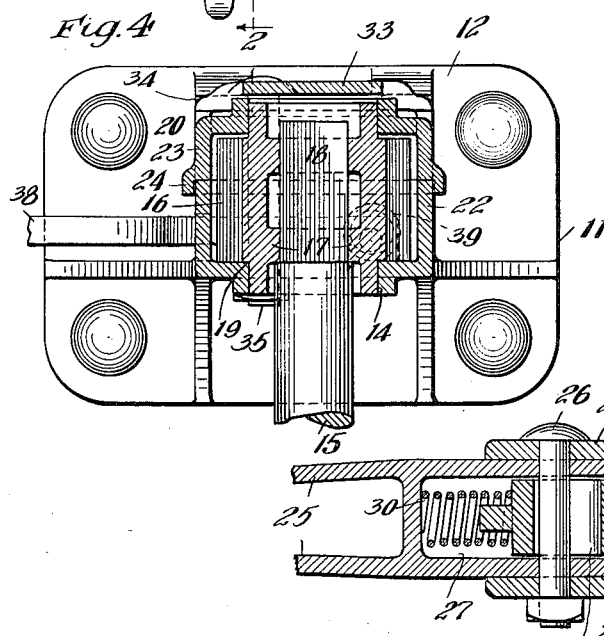
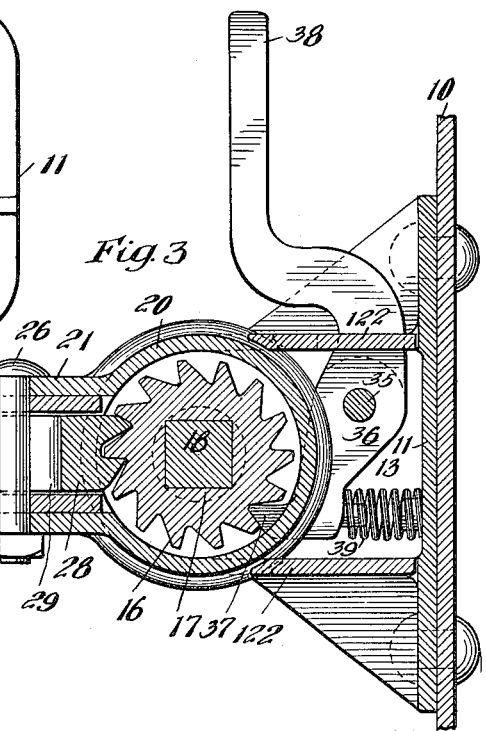
INVENTOR.
Charles E. Dath
BY Geo. I. Haight
ATTORNEY

UNITED STATES PATENT OFFICE.

CHARLES E. DATH, OF CHICAGO, ILLINOIS, ASSIGNOR TO WILLIAM H. MINER, OF CHAZY, NEW YORK.

HAND-BRAKE.

1,300,351.  Specification of Letters Patent.  Patented Apr. 15, 1919.

Application filed January 8, 1918. Serial No. 210,878.

*To all whom it may concern:*

Be it known that I, CHARLES E. DATH, a citizen of the United States, residing at Chicago, in the county of Cook and State of Illinois, have invented a certain new and useful Improvement in Hand-Brakes, of which the following is a full, clear, concise, and exact description, reference being had to the accompanying drawings, forming a part of this specification.

This invention relates to improvements in hand brakes.

The object of the invention is to provide a hand brake more particularly adapted for freight cars and the like having a vertical brake staff and is designed as an improvement on the structure shown in Perry Brown Patent No. 1,185,972 of June 6, 1916.

In the drawing forming part of this specification, Figure 1 is an elevational view of a hand brake embodying my improvements, showing the same as applied on the end wall of a box car. Fig. 2 is a vertical, sectional view taken substantially on the line 2—2 of Fig. 1. Fig. 3 is an enlarged, horizontal, sectional view taken substantially on the line 3—3 of Fig. 1. And Fig. 4 is an enlarged, vertical, sectional view taken substantially on the line 4—4 of Fig. 2.

In said drawing, 10 denotes the end or other wall of a car to which my improved brake is adapted to be applied. Secured to the wall 10 is a combined supporting and bearing bracket 11, the latter having a vertical wall or flange 12 by which it is riveted to the wall 10 of the car and a horizontal wall or web 13. The latter is recessed as indicated at 14, to form a suitable opening to receive the upper end of the brake staff 15 and also to form a bearing for the lower end of the ratchet wheel 16. The ratchet wheel 16 has a central recess of non-circular cross section, as indicated at 17, and is adapted to fit a correspondingly formed upper end 18 of the staff 15. Near the bottom, the ratchet wheel 16 is shouldered, as indicated at 19, so that it is adapted to be supported on the horizontal wall 13 of the bracket 11.

Loosely mounted on the ratchet wheel 16 and independently rotatable with respect thereto is a circular hollow sleeve 20 having a laterally extended socket 21. The sleeve 20 is in the form of an inverted cup and fits over the upper half of the ratchet wheel 16.

The bracket 11 is provided with an upstanding, partly circular flange 22 of the same diameter as the depending circular flange portion 23 of the sleeve 20, the latter resting upon and being supported by the upstanding flange 22. To maintain the sleeve 23 in proper central position, it is preferably provided with an offset rib 24 at its lower edge which fits over the flange 22. It will be apparent from an inspection of the drawing, particularly Fig. 4, that the flange 22 in conjunction with the sleeve 20 form a housing for the ratchet wheel and pawl, hereinafter described, associated therewith.

Pivotally mounted in the socket 21 of the rotatable sleeve 20 is a gravity drop handle 25, the pivotal connection between the handle and the socket 21 being obtained by means of a bolt 26. The upper end of the handle 25 is itself provided with an interior recess or socket, as indicated at 27, within which is slidably mounted a double tooth pawl 28. The pawl 28 has an elongated slot 29 to accommodate the bolt 26 so that the pawl 28 is slidable with respect to the bolt 26 and is prevented by the latter from accidentally falling out. In this manner, the bolt 26 serves a double function in that it forms the pivot for the operating handle and the retaining means for the pawl. The pawl 28 is held in operative engagement with the ratchet wheel 16, when the handle 25 is in horizontal position, by means of a spring 30 located in the recess 27. It is obvious from an inspection of Fig. 2, that when the handle 25 is dropped down to vertical position under the influence of gravity, the pawl 28 will be disengaged from the ratchet wheel. The socket member 21 of the rotatable sleeve is preferably provided with a transverse web 31 which engages an adjacent portion 32 of the handle when the latter is in vertical position to thereby limit the swinging movement of the handle, as will be understood from an inspection of Fig. 2.

In order to prevent the sleeve 20 from accidental displacement vertically, a small cap plate 33 is employed which extends over said sleeve at its outer end, the inner end of said plate 33 being caught in a shallow notch 34 in the vertical wall 12 of the bracket casting. The cap plate 33 is supported by the upwardly and inwardly extended flanges 122 of the bracket casting. The flange portions 122 are in part a continuation of the circular flange portion 22 but are extended higher than the latter and are disposed at right angles to the vertical wall 12 of the bracket casting. To retain the cap plate 33 securely in position, a bolt 35 is used which extends through the cap plate and through the lower wall 13 of the bracket casting. To hold the ratchet wheel and the staff 15 against movement in an unwinding direction and maintain the chain tight, a locking dog 36 is employed. The dog 36 has a tooth 37 at its inner end coöperable with the ratchet wheel 16 and at its outer end a handle 38 which is extended laterally through a suitable notch in one of the flange portions 122. The dog 36 is also pivotally mounted and for this purpose I utilize the bolt 35, as will be apparent from an inspection of Figs. 2 and 3, to thereby reduce the number of parts. The dog 36 is normally held in engagement with the ratchet wheel by means of a suitable spring 39 contained within the bracket casting.

By the arrangement hereinbefore described, I am enabled to reduce the number of parts to a minimum and at the same time reduce the weight of the parts without sacrificing any of the efficiency and simplicity of the device as compared with that disclosed in said Patent No. 1,185,972.

I claim:

1. In a brake, the combination with a vertical brake staff having a ratchet wheel thereon, of a sleeve loosely rotatably mounted with respect to said ratchet wheel, an operating handle pivotally attached to said sleeve by means of a pivot pin, and a spring controlled pawl carried by said handle, said pivot pin acting as a retainer for said pawl to prevent accidental removal thereof from the handle, said pawl being coöperable with the ratchet wheel when the handle is in horizontal position.

2. In a brake, the combination with a bracket adapted to be secured to a car wall, of a ratchet wheel rotatably mounted on and supported by said bracket, a sleeve loosely encircling said ratchet wheel, said sleeve having a laterally extended socket, a gravity controlled operating handle, a pin for pivotally connecting said handle with said sleeve within said socket, a spring controlled pawl carried by said handle, said pawl being slotted to accommodate said pin, a retaining plate for holding said sleeve in proper position, a pivotally mounted spring controlled locking dog coöperable with the ratchet wheel, and a bolt for securing said cap plate to said bracket and also serving as the pivot for said dog.

3. In a hand brake for railway cars and the like, the combination with a bracket adapted to be secured to a vertical car wall, said bracket including a vertical wall, a horizontal flange and two vertical flanges extending outwardly from the vertical wall and above said horizontal flange, said horizontal flange being provided also with an upwardly extending annular flange adapted to form part of a housing, said horizontal flange being also perforated to accommodate a vertical brake staff; of a vertical brake staff extending through said horizontal flange of the bracket; a ratchet wheel mounted on said brake staff above said horizontal flange and disposed partly within said annular flange; a member oscillatably mounted on said brake staff and coöperating with said annular flange to complete the housing for said ratchet wheel; a pawl operating handle pivotally attached to said member; a pivoted locking dog coöperable with said ratchet wheel to prevent accidental reverse rotation of the staff; a top plate extending over said member to retain the latter in operative position, said top plate being detachably connected with said bracket; and means for securing said bracket to a car wall, all of said securing means being arranged to pass through said vertical wall of the bracket.

In witness that I claim the foregoing I have hereunto subscribed my name this 29th day of Dec. 1917.

CHARLES E. DATH.